United States Patent Office 3,450,813
Patented June 17, 1969

3,450,813
DENTIFRICE COMPOSITIONS COMPRISING ZIRCONIUM SILICATE OF PARTICULAR PARTICLE SIZE
Joseph C. Muhler, Indianapolis, Ind., assignor to Indiana University Foundation, Bloomington, Ind., a not for profit corporation of Indiana
No Drawing. Continuation-in-part of application Ser. No. 453,515, May 5, 1965. This application Oct. 6, 1967, Ser. No. 673,283
The portion of the term of the patent subsequent to July 11, 1984, has been disclaimed
Int. Cl. A61k 7/16
U.S. Cl. 424—52       19 Claims

ABSTRACT OF THE DISCLOSURE

New and more effective dentifrice preparations may be obtained by employing zirconium silicate ($ZrSiO_4$) having particle sizes in the range of up to about 8 microns particle size as a cleaning and polishing constituent thereof, as hereinafter described in detail. Additionally, the zirconium silicate agents of the present invention have been shown to enhance the effectiveness of other dentifrice cleaning and polishing constituents such as calcium pyrophosphate ($Ca_2P_2O_7$), calcium hydrogen phosphate dihydrate/anhydrous calcium hydrogen phosphate ($CaHPO_4 \cdot 2H_2O/CaHPO_4$)

insoluble sodium metaphosphate $[(NaPO_3)_x]$, calcium carbonate ($CaCO_3$), talcs $[Mg_3Si_4O_{10}(OH)_2]$ containing at least a minor amount of tremolite $[(CaMg_3(SiO_3)_4]$, and substantially water-impervious, cross-linked, thermosetting, highly polymerized synthetic resins (e.g., melamine formaldehyde resins), such as those described in Cooley et al. U.S. Patent No. 3,070,510. Further, anticariogenic adjuvants (such as stannous fluoride, $SnF_2$) may advantageously be incorporated in such dentifrice preparations since the described cleaning and polishing mixtures exhibit a high degree of ionic compatibility with fluoride, tin (II), and zirconium ions. Talcs containing at least a minor amount of tremolite have independent utility as dentifrice cleaning and polishing agents.

CROSS-REFERENCE

This is a continuation-in-part of applicant's co-pending United States patent application entitled Anticariogenic and Anti-Calculus Dentifrice Cleaning and Polishing Agent and Dentifrice Preparations Incorporating Same, Ser. No. 453,515, filed May 5, 1965, now abandoned.

BACKGROUND OF THE INVENTION

Field of the invention

The present invention relates to new dentifrice cleaning and polishing agents and to the formulation and utilization of dentifrice preparations incorporating such cleaning and polishing agents. In particular, the invention relates to a dentifrice cleaning and polishing composition comprising zirconium silicate ($ZrSiO_4$) having particle sizes in the range of up to about 8 microns which compositions may further comprise one or more other dentifrice cleaning and polishing agents such as calcium pyrophosphate ($Ca_2P_2O_7$), calcium hydrogen phosphate dihydrate/anhydrous calcium hydrogen phosphate ($CaHPO_4 \cdot 2H_2O/CaHPO_4$)

talcs $[Mg_3Si_4O_{10}(OH)_2]$ containing at least a minor amount of tremolite $[CaMg_3(SiO_3)_4]$, and substantially water-impervious, cross-linked thermosetting, highly polymerized resins (e.g., melamine formaldehyde resins) as set forth and described in Cooley et al. U.S. Patent No. 3,070,510. These compositions serve to clean and polish dental hard tissue in a novel manner such that accumulations of pellicle and materia alba and occurrence and reformation of calculus on oral hard tissue are markedly reduced and also enhance the effectiveness of anticariogenic adjuvants such as fluoride, stannous, zirconium ions, or combinations thereof.

Description of the prior art

Dental research has developed substantial evidence that beyond the age of forty years loss of teeth is predominantly the result of periodontal involvement rather than dental caries. The most important single factor contributing to periodontal disease is the accumulation of dental calculus (e.g., salivary tartar) on the teeth. These deposits result in tissue inflammation of the surrounding gingiva, and, as the condition increases in severity, the supporting bone is also affected. These reactions lead to the destruction of the supporting structures and the subsequent mass loss of teeth.

Heretofore, available dentifrice abrasives such as insoluble sodium metaphosphate $[NaPO_3)_x]$, calcium hydrogen phosphate dihydrate/anhydrous calcium hydrogen phosphate ($CaHPO_4 \cdot 2H_2O/CaHPO_4$), and calcium pyrophosphate ($Ca_2P_2O_7$) have exhibited relatively unsatisfactory enamel polishing qualities and consequently have not been wholly effective in preventing the accumulation of materia alba, oral debris, plaque, pellicle, stains, and dental calculus. In particular, while conventional cleaning and polishing agents used with a toothbrush are capable, to varying degrees, of removing materia alba, food particles, exogenous stains, and other tooth surface pigmentations when utilized in ordinary daily brushings, they have not exhibited the ability to remove the more resistant forms of enamel pigments and to produce a smooth tooth surface resistant to dental calculus reformation. Furthermore, these conventional abrasives leave the teeth esthetically less desirable than would more effective polishing agents.

In an attempt to improve enamel polishing qualities and cleaning efficiency, some commercial dentifrices now contain abrasive materials such as alumina ($Al_2O_3$) which have been reported to impart a high polish to dental enamel when a low particle size is employed (100 percent less than 0.5 micron in alpha polishing alumina). However, such materials do not clean enamel effectively and have been shown to excessively abrade the dental hard tissue (i.e., enamel and dentin).

The beneficial effects, in terms of a reduction in the incidence of dental caries, resulting from the incorporation of fluoride salts, especially tin-containing fluoride salts, are well known. However, efforts to utilize such salts in dentifrices suitable for home use have been handicapped by the tendency for fluoride and/or stannous ions to be inactivated and rendered unavailable by other ingredients, particularly the abrasive component of such dentifrices. While generally speaking, dentifrice abrasives in therapeutic products used today are compatible with agents such as fluoride and tin, there is a wide variation in compatibility. No calcium-containing abrasives are more than 80% compatible. And the non-calcium containing abrasives, while being somewhat more compatible, are inferior with regard to enamel polishing.

For example, Cooley et al. U.S. Patent No. 3,070,510 teaches the use of substantially water-impervious, cross-linked, thermosetting, highly polymerized resins as dentifrice cleaning and polishing agents. Although resin agents of the type disclosed in the said patent exhibit improved fluoride and tin ion compatibility relative to calcium pyrophosphate, these agents similarly do not provide maximum cleaning and polishing characteristics.

A wide variety of materials such as tin oxides, tin silicates, and the like may be used in combination at various ratios and will effectively reduce the enamel and dentin abrasion properties thereof. However, these materials have other important disadvantages. For example, the use of common talcs or silicates results in a marked decrease in polishing and cleaning, and in some cases, therapeutic ion compatibility. Similarly, the use of tin oxide in some dentifrices decreases cleaning efficacy and is not a practical dentifrice constituent from a raw material cost standpoint.

Thus, prior art materials intended for use as cleaning and polishing constituents of dentifrice preparations have been unsatisfactory in at least three respects, namely, relatively poor cleaning and polishing performances (especially with respect to prevention of re-accumulation of dental calculus, pellicle, materia alba, and the more resistant forms of oral hard tissue stains and pigmentations), inactivating the effect of anticariogenic agents, and adverse abrasion on enamel and dentin.

SUMMARY OF THE INVENTION

In accordance with the present invention, it has been found that new and more effective dentifrice preparations may be obtained by incorporating therein as a cleaning and polishing agent zirconium silicate ($ZrSiO_4$) having particles distributed in a first level of greater than 0 and equal to or less than 3 microns, a second level of greater than 3 microns and equal to or less than 5 microns, and a third level of greater than 5 microns and equal to or less than about 8 microns, the three levels being combined in a percentage ratio range of about 80–95% of the first level, greater than 0 up to about 15% of the second level, and greater than 0 up to about 12% of the third level. Such a cleaning and polishing agent may further comprise other dentifrice cleaning and polishing agents such as calcium pyrophosphate ($Ca_2P_2O_7$), calcium hydrogen phosphate dihydrate/anhydrous calcium hydrogen phosphate ($CaHPO_4 \cdot 2H_2O/CaHPO_4$), insoluble sodium metaphosphate [$(NaPO_3)_x$], calcium carbonate ($CaCO_3$), talcs [$Mg_3Si_4O_{10}(OH)_2$] containing at least a minor amount of tremolite [$CaMg_3(SiO_3)_4$], and substantially water-impervious, cross-linked, thermosetting, highly polymerized, synthetic resins (e.g., melamine formaldehyde resins) as set forth and described in Cooley et al. U.S. Patents Nos. 3,070,510 and 3,251,800, and mixtures of these other agents. It has further been found that talcs containing at least a minor amount of tremolite have independent utility as dentifrice cleaning and polishing agents as well. When used alone or with zirconium silicate particles, the talc and tremolite particles range in size up to about 50 microns, with the majority falling in the 5–20 micron range, as hereinafter described in detail. It has further been found that the novel cleaning and polishing agents produced in accordance with the present invention also serve to enhance the effectiveness of anticariogenic adjuvants (e.g., fluoride, stannous, or zirconium ions, or combinations thereof). It has likewise been discovered that utilization of the dentifrice preparations produced in accordance with the present invention provides a novel method for cleaning and polishing teeth, for diminishing the likelihood of calculus reformation thereon, and for reducing the dental caries formed thereon.

Through the use of the cleaning and polishing agents of the present invention the difficulty experienced with prior art dentifrice cleaning and polishing agents may be overcome, and compositions of the present invention may therefore be used to formulate dentifrices with superior cleaning and polishing capabilities and with enhanced anticariogenic ion compatibilities.

Accordingly, it is a primary object of the present invention to provide a cleaning and polishing agent which is capable of reducing the reformation of dental calculus and yet which is suitable for incorporation in a dentifrice preparation.

Another object of the present invention is to provide an anticalculus cleaning and polishing agent of the character described which is effective in removing pellicle and dental enamel stains and pigmentations.

Another object of the present invention is to provide anticalculus dentifrice preparations incorporating a cleaning and polishing agent of the character described.

A further object is to provide a dentifrice preparation incorporating at least one fluoride-containing anticariogenic adjuvant in combination with an anticalculus cleaning and polishing agent of the character described which further serves to enhance the effectiveness of the anticariogenic adjuvant.

These and other objects, advantages, and features of the present invention will hereinafter appear, and, for purposes of illustration, but not of limitation, exemplary embodiments of the subject invention are hereinafter described in detail.

DESCRIPTION OF THE PREFERRED EMBODIMENTS

In accordance with the subject invention, it has been found that optimal cleaning and polishing characteristics for a dentifrice cleaning and polishing agent are exhibited by zirconium silicate ($ZrSiO_4$) having particles distributed in a first level of greater than 0 and equal to or less than 3 microns, a second level of greater than 3 microns and equal to or less than 5 microns, and a third level of greater than 5 microns and equal to or less than about 8 microns, the three levels being combined in a percentage ratio range of about 80–95% of the first level, greater than 0 up to about 15% of the second level, and greater than 0 up to about 12% of the third level. Further, it has been found that zirconium silicate of the character described likewise enhances the dental cleaning and polishing capabilities of other dentifrice cleaning and polishing agents such as calcium pyrophosphate ($Ca_2P_2O_7$), calcium hydrogen phosphate dihydrate/anhydrous calcium hydrogen phosphate combinations ($CaHPO_4 \cdot 2H_2O/CaHPO_4$), insoluble sodium metaphosphate [$(NaPO_3)_x$], calcium carbonate ($CaCO_3$), substantially water-impervious, cross-linked, thermosetting, highly polymerized resins (e.g., melamine formaldehyde resins) of the type described in Cooley et al. U.S. Patents Nos. 3,070,510 and 3,251,800, talc [$Mg_3Si_4O_{10}(OH)_2$] containing at least a minor amount of tremolite [$CaMg_3(SiO_3)_4$], or mixture thereof. In addition, it has been found that zirconium silicate of the character described exhibits a high level of ionic compatibility with anticariogenic adjuvants such as stannous, fluoride, and zirconium ions, and that zirconium silicate likewise enhances the ionic compatibility of the above-mentioned other dentifrice cleaning and polishing agents. It has also been found that talc [$Mg_3Si_4O_{10}(OH)_2$] containing at least a minor amount of tremolite $$[CaMg_3(SiO_3)_4]$$

having particle sizes in the range of up to about 50 microns exhibits independent utility as a dentifrice cleaning and polishing agent, both in terms of improved cleaning and polishing capability and in terms of enhanced ionic compatibiilty with anticariogenic adjuvants.

As a result of the foregoing, the cleaning and polishing compositions of the present invention find utility both in anticariogenic dentifrices (i.e., dentifrices containing at least one anticariogenic ionic adjuvant in combination with a compatible cleaning and polishing agent) and in conventional dentifrices (i.e., dentifrices that do not contain any anticariogenic talc adjuvant).

The size of particles in cleaning and polishing compositions can be expressed in a number of different ways, one of the most common of which is "mean diameter," i.e., the arithmetical average of the diameters of particles in a representative sample. As hereinafter utilized, the term "particle size" refers to a mean diameter value.

Zirconium silicate is a well-known industrial abrasive which is used for the grinding and polishing of glass and ceramics; however, prior to the subject invention, this material had not been proposed for use as a cleaning and polishing component of a dentifrice preparation for frequent and direct application to the teeth. While Cooley et al. U.S. Patent No. 3,151,210 describes dentifrice abrasives embodying $ZrSiO_4$. Cooley et al. are able to achieve their objective only by providing a thermoplastic resin coating on the $ZrSiO_4$. This coating so alters the $ZrSiO_4$ that the same results are not achieved as are obtained with the $ZrSiO_4$ of the present invention. Accordingly, it must be emphasized that the $ZrSiO_4$ of the present invention is uncoated and acts directly on the oral hard tissues without the interposition of a plastic coating. The extreme hardness and the abrasion characteristics exhibited by zirconium silicate (e.g., a hardness number of 7.5 on the Mohs scale for commercially available zirconium silicate, such as types used for grinding of glass) would suggest to one skilled in the art that zirconium silicate would seriously damage (i.e., abrade and scratch) tooth structure and would thus be unsuitable for use on the teeth. Hence, Cooley et al. felt that it was necessary to provide the above-noted plastic coating.

In accordance with the present invention, zirconium silicate, used alone or in combination with other cleaning and polishing agents, is distributed as follows among three levels between 0 and 8 microns particle size: Level I—equal to or less than 3 microns, about 80–95%; Level II—greater than 3 and equal to or less than 5 microns, greater than 0 up to about 15%; and Level III—greater than 5 and equal to or less than about 8 microns, greater than 0 up to about 12%.

The preparation of suitable particle size zirconium silicate can be accomplished by conventional techniques well known to the art. Basically, these techniques involve milling zirconium silicate ore (zircon), followed by standard screen sieving (or air separation) to segregate the desired particle size. Various milling techniques may be utilized in order to obtain the desired surface configurations for the zirconium silicate particles. Particles may be prepared by a ball milling technique. Preferably, the cleaning and polishing agent of the present invention comprises a mixture of ball milled and hammer milled particles.

As is well known to the art, hammer mills utilize a high speed rotary shaft having a plurality of hammers or beaters mounted thereon. The hammers may be T-shaped elements, bars, or rings fixed or pivoted to the shaft or to discs pivoted to the shaft. The shaft runs in a housing containing grinding plates or liners. The grinding action results from the impact between the material being milled and the moving hammers. When zircon ore is milled by an attrition technique such as hammer milling, relatively rough, jagged particles are produced. Particles having such jagged surface configuration function from a tooth cleaning standpoint in a relatively superior manner as compared to more smoothly configured particles.

Similarly, a ball mill comprises a cylindrical or conical shell rotating on a horizontal axis which is charged with a grinding medium such as balls of steel, flint, or porcelain. The grinding is accomplished by the tumbling action of the balls on the material to be ground. Particles of zirconium silicate treated in a ball mill of the character described have relatively smooth surface configurations and function better from the polishing standpoint than more jaggedly configured particles.

In order to achieve the advantages of the present invention, the zirconium silicate particles are distributed over three previously defined levels: Level I—greater than 0 and equal to or less than 3 microns, about 80–95%; Level II—greater than 3 and equal to or less than 5 microns, greater than 0 up to about 15%; and Level III—greater than 5 and equal to or less than about 8 microns, greater than 0 up to about 15%.

When the zirconium silicate is prepared by a ball milling technique (i.e., when relatively smooth particles are employed), the following percentage range distribution is used: Level I, about 85–95%; Level III, about 2–5%; and Level II, balance (i.e., the percentage necessary to bring the total of the percentages up to 100%). When the zirconium silicate is prepared by a hammer milling technique (i.e., when relatively jagged particles are employed), the following percentage range distribution is used: Level I, about 90–95%; Level II, about 5–10%; and Level III, balance, not to exceed 2%.

An optimal cleaning and polishing agent comprises about 85–95% ball milled zirconium silicate having particle sizes lying within Level I; about 3–5% hammer milled zirconium silicate having particles sizes lying within Level II; and the balance ball milled zirconium silicate having particle sizes lying within Level III.

As noted above, the talc $[Mg_3Si_4O_{10}(OH)_2]$ employed in accordance with the present invention contains at least a minor amount of tremolite $[CaMg_3(SiO_3)_4]$ as an "impurity." Such an "impure talc" occassionally occurs in natural deposits, and such naturally occurring impure talcs are preferably acid washed prior to utilization in order to remove other undesirable impurities (e.g., dolomite, $CaCO_3 \cdot MgCO_3$). However, it has also been found that dentifrice cleaning and polishing agents of enhanced cleaning and polishing and anticariogenic ionic compatibility can be obtained by adding at least a minor mount of tremolite to ordinary talcs.

As noted, the tremolite is preferably present as at least a minor constituent of the talc composition. More specifically, tremolite should preferably be present at a level of at least about 4%, by weight of the talc composition. One talc comprising about 18% tremolite is especially preferred by reason of its availability in natural deposits. However, the presence of tremolite appears to enhance the activity of talc up to levels of about 50% tremolite, although mixtures containing in excess of 50% tremolite also exhibit the characteristics desired of a dentifrice cleaning and polishing agent. Thus, a convenient maximum level for the tremolite is at least about 50%, by weight of the over-all talc mixture.

The "impure talc" comprising at least a minor amount of tremolite as described herein is referred to hereinafter by the term "improved talc."

The improved talc particles in accordance with the present invention range in size up to about 50 microns, with over 95% of the particles being less than 30 microns and with the majority falling in the 5 to 20 micron range. Substantially all the improved talc particles are of less than 50 microns particle size since particles greater than 50 microns are gritty to the teeth and tongue and are unsuitable for use in dentifrice compositions. The improved talc particles are preferably distributed throughout five levels in the following percentages: Level A—equal to or less than 5 microns, about 15 to 40%; Level B—greater than 5 and equal to or less than 10 microns, about 25 to 35%; Level C—greater than 10 and equal to or less than 20 microns, about 35 to 45%; Level D—greater than 20 and equal to or less than 30 microns, about 9 to 11%; and Level E—greater than 30 and equal to or less than 50 microns, about 1 to 2%.

An especially effective particle size distribution within the described ranges is defined as follows: Level A, 22.2%; Level B, 28.9%; Level C, 39.7%; Level D, 8.0%; and Level E, 1.0%.

The improved talc particles are extremely thin in one dimension (1 micron or less) and show a foliated or micaceous crystalline structure. When used alone or in admixture with zirconium silicate, superior dentifrice abrasives are obtained. Where a mixture of improved talc and zirconium silicate is employed, the mixture preferably comprises improved talc and zirconium silicate in weight ratios ranging between about 3:1 and 1:3, with the preferred mixture of the present invention being a 3:1 improved talc-zirconium silicate weight mixture.

The present invention also comprehends the admixture of zirconium silicate with other dental cleaning and polishing agents such as calcium pyrophosphate $$(Ca_2P_2O_7)$$

calcium hydrogen phosphate dihydrate/anhydrous calcium hydrogen phosphate ($CaHPO_4 \cdot 2H_2O/CaHPO_4$), insoluble sodium metaphosphate [$(NaPO_3)_x$], calcium carbonate ($CaCO_3$), and substantially water-imprevious, cross-linked, thermosetting, highly polymerized synthetic resins (e.g., melamine formaldehyde resins), such as those described in U.S. Patents Nos. 3,070,510 and 3,251,800 and mixtures of these other agents. More particularly, a mixture comprising zirconium silicate and one or more of the foregoing other dental cleaning and polishing agents should comprise in excess of about 1% zirconium silicate and preferably in excess of about 10% zirconium silicate, by weight of the cleaning and polishing mixture. Especially good results are achieved with cleaning and polishing mixtures comprising about 20% and preferably about 25% zirconium silicate (i.e., a 1:3 weight ratio of zirconium silicate to the other agent), by weight of the mixture. The percentage of zirconium silicate expressed by weight of the dentifrice preparation naturally varies depending on the amount of cleaning and polishing mixture that is provided in the dentifrice preparation. Moreover, there is no practical maximum level for the zirconium silicate since as pointed out elsewhere zirconium silicate per se is a superior dentifrice cleaning and polishing agent in its own right.

The foregoing mixtures of zirconium silicate and other cleaning and polishing agents have enhanced cleaning and polishing capabilities relative to the other cleaning and polishing agents taken alone as will hereinafter be demonstrated in greater detail.

The zirconium silicate and improved talc cleaning and polishing agents of the present invention are employed in dentifrice preparations within the range of from about 0.5% up to about 95% by weight, depending upon the particular formulation desired, as is well known to one skilled in the art. Toothpastes preferably contain a total of about 20–70% cleaning and polishing agent by weight, whereas tooth powders contain about 60–90% cleaning and polishing agent by weight. In accordance with the present invention, amounts of zirconium silicate corresponding to a very small percentage by weight of the over-all dentifrice composition can be used in admixture with other cleaning and polishing agents as hereinbefore described depending on the particular formulation desired, with the admixture of zirconium silicate and other agents (i.e., the total cleaning and polishing component) being provided in the over-all preparation at a level of about 20–70% by weight of the preparation where the preparation is a toothpaste and about 60–90% by weight of the preparation where the preparation is a tooth powder.

Dentifrice preparations utilizing the cleaning and polishing agents of the subject invention are prepared in a conventional manner and will usually include additional ingredients which render the over-all composition commercially acceptable to consumers.

Toothpastes require a binder substance to impart desired textural properties. Natural gum binders such as gum tragacanth, gum karaya, gum arabic, etc. and seaweed derivatives such as Irish moss and alginates, and water soluble cellulose derivatives, such as hydroxyethyl cellulose and sodium carboxymethyl cellulose can be used for this purpose. Desirably, those materials are employed which are most compatible with fluoride ion. Binders which have no ionic groups, such as hydroxyethyl cellulose are especially preferred. Improvements in texture can also be attained by including an additional material such as colloidal magnesium aluminum silicate.

Thickening agents in an amount of from 0.5% to 5.0% by weight can be used to form a satisfactory toothpaste.

Toothpastes conventionally contain sudsing agents. Suitable sudsing agents include, but are not limited to, water-soluble alkyl sulfates having from 8 to 18 carbon atoms in the alkyl radical, such as sodium lauryl sulfate, water-soluble salts of sulfonated monoglycerides of fatty acids having from 10 to 18 carbon atoms in the alkyl radical such as sodium coconut monoglyceride sulfonate, salts of fatty acid amides of taurines such as sodium-N-methyl palmitoyl tauride, and salts of fatty acid esters of isethionic acid.

Sudsing agents can be used in the compositions of this invention in an amount of from about 0.5% to about 5.0% by weight of the total composition.

It is also desirable to include some humectant material in a toothpaste to keep it from hardening. Materials commonly used for this purpose include glycerine, sorbitol, and other polyhydric alcohols. The humectants can comprise up to 35% of the toothpaste composition.

Flavoring materials may be included in toothpaste formulations including small amounts of oils of wintergreen and peppermint and sweetening agents such as saccharin, dextrose, and levulose.

Compositions of exemplary anticalculus dentifrice formulations employing the cleaning and polishing agents of the present invention are given in the following examples.

Example I illustrates an exemplary dentifrice formulation employing zirconium silicate particles lying within the critical size distribution ranges described previously and comprising 90% ball milled (i.e., relatively smooth surface configuration) zirconium silicate having a particle size lying within Level I; 4% hammer milled (i.e., relatively rough surface configuration) zirconium silicate having a particle size lying within Level II; and 6% ball milled zirconium silicate having a particle size lying within Level III (hereinafter referred to as zirconium silicate "P").

EXAMPLE I

| Constituent: | Parts by weight, percent |
|---|---|
| Zirconium silicate "P" | 48.20 |
| Water | 19.00 |
| Glycerine | 12.80 |
| Sorbitol (70% aqueous solution) | 14.80 |
| Sodium coconut monoglyceride sulfonate | 0.95 |
| Sodium lauryl sulfate | 0.95 |
| Veegum (magnesium aluminum silicate) | 0.95 |
| Sodium carboxymethyl cellulose | 1.05 |
| Flavoring agents | 0.14 |
| Coloring agents | 1.05 |
| Saccharin, sodium | 0.11 |
| | 100.00 |

Example II illustrates an exemplary dentifrice formulation employing an improved talc cleaning and polishing agent comprising 18% tremolite by weight of the agent, 95% of the particles of the agent being less than 30 microns, with the majority falling into the 5–20 micron range (hereinafter referred to as improved talc "P").

EXAMPLE II

Constituent: Parts by weight, percent

Improved talc "P" _____ 41.20
    Water _____ 26.50
    Glycerin _____ 12.00
    Sorbitol (70% aqueous solution) _____ 15.00
    Sodium coconut monoglyceride sulfonate __ 0.50
    Sodium lauryl sulfate _____ 2.00
    Veegum (magnesium aluminum silicate) ___ 0.40
    Sodium carboxymethyl cellulose _____ 1.00
    Coloring agents _____ 0.45
    Flavoring agents _____ 0.77
    Saccharin, sodium _____ 0.18
                                             _____
                                             100.00

Example III illustrates an exemplary dentifrice formulation employing an improved talc-zirconium silicate mixture in the preferred 3:1 weight ratio.

EXAMPLE III

Constituent: Parts by weight, percent

Zirconium silicate "P" _____ 10.30
    Improved talc "P" _____ 30.90
    Water _____ 26.50
    Glycerin _____ 12.00
    Sorbitol (70% aqueous solution) _____ 15.00
    Sodium coconut monoglyceride sulfonate __ 0.50
    Sodium lauryl sulfate _____ 2.00
    Veegum (magnesium aluminum silicate) ___ 0.40
    Sodium carboxymethyl cellulose _____ 1.00
    Coloring agents _____ 0.45
    Flavoring agents _____ 0.77
    Saccharin, sodium _____ 0.18
                                             _____
                                             100.00

The following examples give exemplary formulations for dentifrices comprising zirconium silicate and other dentifrice cleaning and polishing agents. The zirconium silicate in Example IV has a relatively smooth surface configuration and has about 88% of its particles in Level I; 8% in Level II; and 4% in Level III. The zirconium silicate in Example V has a relatively rough surface configuration and has about 93% of its particles in Level I; 5% in Level II; and 2% in Level III.

EXAMPLE IV

Constituent: Parts by weight, percent

Zirconium silicate _____ 24.10
    Calcium pyrophosphate _____ 24.10
    Water _____ 19.00
    Glycerine _____ 12.80
    Sorbitol (70% aqueous solution) _____ 14.80
    Soldium coconut monoglyceride sulfonate _ 0.95
    Sodium lauryl sulfate _____ 0.95
    Veegum (magnesium aluminum silicate) ___ 0.95
    Sodium carboxymethyl cellulose _____ 1.05
    Flavoring agents _____ 0.14
    Coloring agents _____ 1.05
    Saccharin, sodium _____ 0.11
                                             _____
                                             100.00

EXAMPLE V

Constituent: Parts by weight, percent

Zirconium silicate _____ 20.60
    Calcium hydrogen phosphate dihydrate/
      anhydrous calcium hydrogen phosphate
      (1:1 weight mixture) _____ 20.60
    Water _____ 26.50
    Glycerin _____ 12.00
    Sorbitol (70% aqueous solution) _____ 15.00
    Sodium coconut monoglyceride sulfonate __ 0.50
    Sodium lauryl sulfate _____ 2.00
    Veegum (magnesium aluminum silicate) ___ 0.40
    Sodium carboxymethyl cellulose _____ 1.00
    Coloring agents _____ 0.45
    Flavoring agents _____ 0.77
    Saccharin, sodium _____ 0.18
                                             _____
                                             100.00

EXPERIMENTAL EVALUATIONS

The superiority of the zirconium silicate and improved talc cleaning and polishing compositions disclosed herein as compared with conventional dentifrice abrasives has been substantiated by the following experimental evaluations. A definitive laboratory cleaning test procedure has been used to evaluate a number of dentifrice cleaning and polishing agents, among which where the cleaning and polishing mixtures produced in accordance with the present invention. This procedure (as set forth and described in Cooley et al. U.S. Patent No. 3,151,027) involves the use of polyester plastic blocks specifically designed for use in an electrical toothbrushing machine. The blocks are ground smooth, washed, dried, and a thin coating of black lacquer is carefully applied to the surface of the block. The blocks are then inserted in the toothbrushing machine and brushed with slurries of various cleaning and polishing agents for 3,000 double strokes with a pressure of the toothbrushes on the lacquer surface of 150 grams. Reflectance measurements of the blocks are then obtained through the use of a reflectometer. The cleaning values for the materials tested are given in Table I, on a scale ranging from 0 to 6.5, a higher value indicating a greater cleaning ability.

Enamel polishing values have also been obtained for the same materials in accordance with a so-called "toothbrush polishing procedure." In accordance with this method, the lingual surfaces of freshly extracted maxillary anterior teeth are reduced with the aid of a diamond disc, and the teeth are mounted by means of a low melting alloy, such as Wood's metal, on hexagonal jigs constructed so as to fit the movable stage of a reflectometer. The exposed labial surface of each tooth is mounted in such a manner that the height of the contour is a suitable distance above the base of the jig. Throughout the procedure, care is taken to ensure that the teeth do not become dry in order to prevent damage of the tooth tissues. The exposed enamel surface is then dulled by exposing it to 0.10% hydrochloric acid (pH 2.2) for 30 seconds. Any acid remaining on the tooth surface is neutralized by immediately transferring the tooth to a saturated sodium carbonate solution for 30 seconds. The tooth is then rinsed with water and blotted dry.

The maximum reflectance of the dulled tooth surface is determined by means of a reflectometer especially adapted to detect the changes in the degree of polish of the enamel surface. The reflectometer is constructed so that the enamel is exposed to a beam of polarized light, and the amount of light reflected from the enamel surface is determined by a photoelectric cell which in turn activates a galvanometer. The smoother the enamel surface, the smaller the amount of diffused and absorbed light and, hence, the higher the galvanometer reading.

After the maximum reflectance of the dulled tooth is determined, the tooth is polished with an automatic toothbrushing machine for a specified number of strokes employing the material to be tested. After the tooth has been brushed, the enamel surface is rinsed with water so as to remove any residual particles of the cleaning and polishing agent, and the reflectance of the enamel surface is again measured with the tooth located in exactly the same position as that used to obtain the "dull" reading. The absolute change in the amount of reflectance between the dulled and polished enamel surfaces is taken as a measure of the degree of polishing imparted by the prophylaxis treatment. The data are reported in Table I in absolute reflectometer units and, therefore, are indicative of the polishing efficacy of the materials evaluated, the greater the increase in reflectance, the more effective the polishing agent.

TABLE I

| Cleaning and polishing agent | Enamel cleaning | Enamel polishing |
|---|---|---|
| Zirconium silicate [1] | 4.25 | 5.60 |
| Improved talc "P" | 4.50 | 4.40 |
| Improved talc "P"—Zirconium silicate [2] (3:1 weight mixture) | 4.65 | 6.25 |
| Talc (rhomboidic crystal) | 3.83 | 3.40 |
| Calcium carbonate | 1.70 | 1.10 |
| Talc (flat crystal) | 2.02 | 1.30 |
| Insoluble sodium metaphosphate | 3.20 | 3.00 |
| Calcium hydrogen phosphate dihydrate/anhydrous calcium hydrogen phosphate (1:1 weight mixture) | 3.45 | 2.55 |
| $SnHPO_3$ | 2.85 | 2.85 |
| $SnSiO_3$ | 4.60 | 5.90 |
| $Sn_2SiO_4$ | 3.40 | 4.33 |
| Calcium pyrophosphate | 3.70 | 2.90 |

[1] A hammer milled (i.e., relatively rough surface) zirconium silicate having 94% of its particles in Level I; 5% in Level II; and 1% in Level III.
[2] Zirconium silicate having 94.5% of its particles in Level I; 4.0% of its particles in Level II; and 1.5% of its particles in Level III (hereinafter referred to as zirconium silicate "S").

These data illustrate the excellent cleaning and polishing ability of the zirconium silicate, improved talc, and zirconium silicate-improved talc compositions relative to other presently used dentifrice cleaning and polishing agents.

The effectiveness of the zirconium silicate agents of the present invention in enhancing the polishing ability of other abrasive systems has been demonstrated by the following experimental studies. Various mixtures of calcium pyrophosphate (U.S. Patents Nos. 2,876,166 and 2,876,168) and zirconium silicate were formulated into dentifrice preparations, with the over-all cleaning and polishing mixture being present at a level of about 40% by weight of the dentifrice. The relative amounts of the calcium pyrophosphate and zirconium silicate in the mixture were varied, and the enamel polishing score was obtained for each dentifrice preparation in accordance with the foregoing procedure. Enamel polishing scores in absolute reflectometer units are given in Table II along with the mean percent change relative to a pure calcium pyrophosphate system. Very substantial improvements in enamel polishing are achieved by providing zirconium silicate in admixture with the calcium pyrophosphate abrasive system, and especially good results are achieved when the mixture comprises at least about 12% zirconium silicate (4.8% by weight of the dentifrice), although improvements are even achieved at zirconium silicate levels as low as about 4% by weight of the abrasive system (1.6% by weight of the dentifrice).

Table III reports similar data for various combinations of zirconium silicate and an improved calcium pyrophosphate produced in accordance with the teachings of U.S. Patent No. 3,112,247 (i.e., a calcium pyrophosphate comprising predominantly beta phase and having a dentin abrasion value of less than about 700). The data reported in Table III again demonstrate that even a relatively small amount of zirconium silicate enhances the polishing capability of a calcium pyrophosphate dentifrice, and where at least about 20% zirconium silicate is provided by weight of the abrasive system especially good results are achieved.

Table IV gives polishing scores obtained in the foregoing manner for mixtures of zirconium silicate with an abrasive system comprising a 1:1 weight mixture of calcium hydrogen phosphate dihydrate and anhydrous calcium hydrogen phosphate. As reported in Table IV, the admixture of zirconium silicate with this abrasive system substantially enhances its polishing effectiveness, with the most satisfactory improvement being achieved where the zirconium silicate is provided at a level of at least about 20% of the abrasive system (i.e., 8% by weight of the dentifrice preparation).

Table V reports similar data for combinations of zirconium silicate and a melamine formaldehyde resin produced in accordance with the teachings of U.S. Patent No. 3,070,510. Once again, the presence of zirconium silicate substantially enhances the polishing capability of the other cleaning and polishing agent.

TABLE II

| Abrasive system [1] | Additive [2] | Parts by weight (abrasive/additive) | Percent additive in abrasive system | Percent additive in dentifrice | Enamel polishing score | Mean percent change |
|---|---|---|---|---|---|---|
| $Ca_2P_2O_7$ | $ZrSiO_4$ | 25:0 | 0.0 | 0.0 | 1.63 | |
| $Ca_2P_2O_7$ | $ZrSiO_4$ | 24:1 | 4.0 | 1.6 | 2.58 | +58.3 |
| $Ca_2P_2O_7$ | $ZrSiO_4$ | 22:3 | 12.0 | 4.8 | 3.28 | +101.2 |
| $Ca_2P_2O_7$ | $ZrSiO_4$ | 20:5 | 20.0 | 8.0 | 3.33 | +104.3 |
| $Ca_2P_2O_7$ | $ZrSiO_4$ | 17.5:7.5 | 30.0 | 12.0 | 3.60 | +120.9 |

[1] U.S. Patents Nos. 2,876,166 and 2,876,168.
[2] A ball milled (i.e., relatively smooth surface) zirconium silicate having 91% of its particles in Level I; 7% in Level II; and 2% in Level III.

TABLE III

| Abrasive system [1] | Additive studied | | | | Enamel polishing score | Mean percent change |
|---|---|---|---|---|---|---|
| | Name [2] | Parts by wt. (abrasive/additive) | Percent additive in abrasive system | Percent additive in dentifrice system | | |
| $Ca_2P_2O_7$, improved | $ZrSiO_4$ | 25:0 | 0.0 | 0.0 | 1.98 | |
| Do | $ZrSiO_4$ | 24:1 | 4.0 | 1.6 | 2.03 | +2.5 |
| Do | $ZrSiO_4$ | 23:2 | 8.0 | 3.2 | 2.43 | +22.7 |
| Do | $ZrSiO_4$ | 22:3 | 12.0 | 4.8 | 2.63 | +32.8 |
| Do | $ZrSiO_4$ | 20:5 | 20.0 | 8.0 | 3.08 | +55.6 |
| Do | $ZrSiO_4$ | 17.5:7.5 | 30.0 | 12.0 | 3.43 | +73.2 |
| Do | $ZrSiO_4$ | 15:10 | 40.0 | 16.0 | 3.60 | +81.8 |
| Do | $ZrSiO_4$ | 12.5:12.5 | 50.0 | 20.0 | 3.85 | +94.4 |
| Do | $ZrSiO_4$ | 10:15 | 60.0 | 24.0 | 3.98 | +101.0 |
| Do | $ZrSiO_4$ | 5:20 | 80.0 | 32.0 | 4.18 | +111.1 |

[1] U.S. Patent No. 3,112,247.
[2] Zirconium silicate having 95% of its particles in Level I; 2% in Level II; and 3% in Level III (hereinafter referred to as zirconium silicate "E").

TABLE IV

| Abrasive System [1] | Additive | Parts by weight (abrasive/additive) | Percent additive in abrasive system | Percent additive in dentifrice | Enamel polishing score | Mean percent change |
|---|---|---|---|---|---|---|
| $CaHPO_4 \cdot 2H_2O + CaHPO_4$ | $ZrSiO_4$ "E" | 25:0 | 0.0 | 0.0 | 2.18 | |
| $CaHPO_4 \cdot 2H_2O + CaHPO_4$ | $ZrSiO_4$ "E" | 24:1 | 4.0 | 1.6 | 2.20 | +0.9 |
| $CaHPO_4 \cdot 2H_2O + CaHPO_4$ | $ZrSiO_4$ "E" | 23:2 | 8.0 | 3.2 | 2.43 | +11.5 |
| $CaHPO_4 \cdot 2H_2O + CaHPO_4$ | $ZrSiO_4$ "E" | 22:3 | 12.0 | 4.8 | 2.63 | +20.6 |
| $CaHPO_4 \cdot 2H_2O + CaHPO_4$ | $ZrSiO_4$ "E" | 20:5 | 20.0 | 8.0 | 3.48 | +59.6 |
| $CaHPO_4 \cdot 2H_2O + CaHPO_4$ | $ZrSiO_4$ "E" | 17.5:7.5 | 30.0 | 12.0 | 3.73 | +71.1 |
| $CaHPO_4 \cdot 2H_2O + CaHPO_4$ | $ZrSiO_4$ "E" | 15:10 | 40.0 | 16.0 | 3.83 | +75.7 |
| $CaHPO_4 \cdot 2H_2O + CaHPO_4$ | $ZrSiO_4$ "E" | 12.5:12.5 | 50.0 | 20.0 | 3.98 | +82.6 |
| $CaHPO_4 \cdot 2H_2O + CaHPO_4$ | $ZrSiO_4$ "E" | 10:15 | 60.0 | 24.0 | 3.80 | +74.3 |
| $CaHPO_4 \cdot 2H_2O + CaHPO_4$ | $ZrSiO_4$ "E" | 5:20 | 80.0 | 32.0 | 3.83 | +75.7 |
| $CaHPO_4 \cdot 2H_2O + CaHPO_4$ | $ZrSiO_4$ "E" | 0:25 | 100.0 | 40.0 | 3.85 | +76.6 |

[1] 1:1 weight mixture.

TABLE V

| Abrasive System [1] | Additive studied Name | Parts by wt. (abrasive/additive) | Percent additive in abrasive system | Percent additive in dentifrice system | Enamel polishing score | Mean percent change |
|---|---|---|---|---|---|---|
| Resin | $ZrSiO_4$ "E" | 0:1 | 0.0 | 0.0 | 1.88 | |
| Do | $ZrSiO_4$ "E" | 2:1 | 33.3 | 13.3 | 4.10 | +118.1 |
| Do | $ZrSiO_4$ "E" | 1:1 | 50.0 | 20.0 | 4.15 | +120.7 |
| Do | $ZrSiO_4$ "E" | 0:1 | 100.0 | 40.0 | 4.23 | +125.0 |

[1] A melamine formaldehyde resin produced in accordance with U.S. Patent No. 3,070,510.

In sum, the results reported in the foregoing Tables II–V substantiate that other cleaning and polishing agents, such as calcium pyrophosphate, calcium hydrogen phosphate dihydrate/anhydrous calcium hydrogen phosphate, and melamine formaldedyde resins are substantially improved through the addition of as little as a few percent zirconium silicate, with the best results being obtained where the over-all compositions comprise in excess of about 10% and preferably at least about 20% zirconium silicate.

In spite of the described excellence of the compositions of the present invention as cleaning and polishing agents, these materials do not remove substantial amounts of oral hard tissue. Tooth dentin is frequently found exposed at the surface of the teeth near the free gingival margin, particularly in clinical cases where the gingivae have receded. The abrasion of tooth dentin by a cleaning and polishing agent is much greater than the abrasion of tooth enamel by the same agent, i.e., 10–100 times. Consequently, dentin abrasion is considered to be of greater clinical importance than enamel abrasion, and the effect of a cleaning and polishing agent on dentin is used as an important and reliable criterion in the selection of suitable agents. The cleaning and polishing agents utilized in accordance with the subject invention have highly satisfactory dentin abrasion characteristics, a fact which is quite surprising in view of the innate hardness of the materials.

A method for determining dentin abrasion values for dentifrice cleaning and polishing agents is as follows. The dentin portions are separated from human central incisors and exposed to neutron radiation whereby a predetermined portion of phosphate content is converted to $P^{32}$. Each dentin portion is mounted in a low melting alloy, such as Wood's metal, and is submerged in a slurry of the cleaning and polishing agent to be tested. An automatic toothbrush is arranged so that it can be moved back and forth across the surface of the submerged portion of the dentin, and the pressure of this toothbrush is adjusted to 150 grams. The tooth dentin is subjected to brushing action for a given number of strokes, and removed from the slurry. The radioactivity of the slurry is then determined by conventional means. An equivalent piece of dentin, irradiated concurrently with the dentin portion to be brushed, is weighed, dissolved in hydrochloric acid, and the radioactivity determined. Using this as a standard, the amount of tooth dentin removed during the brushing can be determined by comparing the count of the brushing slurry with the count of the standard.

A standard slurry for measuring dentin abrasion is made from calcium pyrophosphate ($Ca_2P_2O_7$). The concentration of the standard slurry is 25.0 grams per 50 cc. of a one percent aqueous sodium carboxymethyl cellulose solution.

To determine the abrasion value of a cleaning and polishing agent, a portion of irradiated tooth dentin is first brushed with a standard calcium pyrophosphate slurry. The same portion of dentin is then cleaned with water and brushed with a slurry of a cleaning and polishing agent to be tested. The dentin is again cleaned and brushed with the standard calcium pyrophosphate slurry. Each of these slurries is counted, the average amounts of radioactive dentin removed by the brushing with the slurries of standard calcium pyrophosphate and with the cleaning and polishing agent being tested are calculated. The amount of dentin removed by the standard calcium pyrophosphate slurry is given an arbitrary value of 500. The factor required to effect the conversion of the number of micrograms of dentin removed to this value of 500 is multiplied times the average amount of dentin removed by brushing with the cleaning and polishing agent being tested.

The dentin abrasion values of various dentifrice cleaning and polishing agents were determined in accordance with the foregoing method. The abrasion values obtained for these agents (as reported in Table VI) fully establish that the zorconium silicate, improved talc, and zirconium silicate-improved talc cleaning and polishing compositions of the present invention fall within the dentin abrasion value range acceptable for a cleaning and polishing agent suitable for use in a commercially feasible dentifrice preparation.

TABLE VI

| Abrasive: | ($P^{32}$) dentin abrasion score |
|---|---|
| Zirconium silicate "P" | 520 |
| Improved talc "P" | 504 |
| Improved talc "P"—zirconium silicate "S" (3:1 weight mixture | 447 |
| Talc (rhomboidic crystal) | 70 |
| Calcium carbonate | 597 |
| Talc (flat crystal) | 37 |
| Insoluble sodium metaphosphate | 440 |
| Calcium hydrogen phosphate dihydrate/anhydrous calcium hydrogen phosphate | 250 |
| $SnHPO_3$ | 73 |
| $SnSiO_3$ | 140 |
| $Sn_2SiO_4$ | 440 |
| $Ca_2P_2O_7$ | 470 |

Enamel cleaning values were obtained for common talc, tremolite, and various talc-tremolite mixtures. The cleaning values were obtained in the previously described manner, except that, rather than measuring cleaning effectiveness with a reflectometer, the absolute loss of weight was measured, a larger weight loss being indicative of a greater cleaning ability. The data are reported in Table VII.

TABLE VII

| Cleaning and Polishing agent (wt. percent) | | Cleaning Score (mg.) |
|---|---|---|
| Talc | Tremolite | |
| 100 | 0 | 0.30 |
| 95 | 5 | 0.26 |
| 90 | 10 | 0.80 |
| 85 | 15 | 0.84 |
| 80 | 20 | 0.88 |
| 75 | 25 | 0.92 |
| 70 | 30 | 0.96 |
| 65 | 35 | 1.22 |
| 60 | 40 | 2.20 |
| 55 | 45 | 2.18 |
| 50 | 50 | 3.08 |
| 0 | 100 | 3.06 |

Measured on the same scale a preferred naturally occurring talc comprising 18% tremolite has a cleaning score of 1.62 and another naturally occurring talc comprising 4% tremolite has a cleaning score of 0.72.

These data confirm that talcs comprising a minor amount, preferably at least about 4%, of tremolite are highly satisfactory dental cleaning agents.

ANTICARIOGENIC EFFECTIVENESS

As previously indicated, the cleaning and polishing agents of the present invention also function as compatible carriers for anticariogenic adjuvants in anticariogenic dentifrice preparations. Preferably, the adjuvant should be presented in the form of fluoride-containing compounds capable of supplying fluoride and stannous ions or combinations thereof, for example, with an additional component such as zirconium ions or germanium ions in biologically available form. The preferred adjuvants are stannous fluorozirconate ($SnZrF_6$), indium fluorozirconate ($InZrF_7$), stannous fluoride ($SnF_2$), and complex zirconium-germanium fluorides [e.g., $Zr(GeF_6)_2$, $ZrGeF_8$, $Ge(ZrF_6)_2$, and $ZrOGeF_6$]. Stannous fluorozirconate, indium fluorozirconate, and the indicated complex salts appear to be the best anticariogenic fluoride-containing adjuvants now known to the dentifrice arts, especially by virtue of the absence of objectionable taste, lack of enamel pigmentation, freedom from damaging gingival tissue, and increased anticariogenic effectiveness obtainable therewith.

Other suitable adjuvants include water-soluble fluoride salts such as $NaF$, $SnF_4$, $KF$, $InF_3$, $PbF_2$, $FeF_2$, and $LiF$, as well as more complex water-soluble fluoride-containing adjuvants such as fluorosilicates, e.g., $Na_2SiF_6$, other fluorozirconates, e.g., $CaZrF_6$, $Na_2ZrF_6$, $K_2ZrF_6$, fluorostannites, e.g., $NaSnF_3$, fluoroborates, e.g., $NaBF_4$, fluorotitanates, e.g., $NaTiF_5$, other fluorogermanates, e.g., $K_2GeF_6$, and mixed halides, e.g., $SnClF$ and $Sn_2ClF_3$. Mixtures of suitable adjuvants may also be utilized. Another suitable adjuvant comprises a mixture of a fluoride salt and an active phosphate compound as set forth and described in applicant's co-pending United States patent application entitled Anticariogenic Compositions and Methods, Ser. No. 535,022, filed Mar. 17, 1966. An especially preferred active phosphate is "Victamide," an ammonium salt of a condensation product of $NH_3$ and $P_4O_{10}$ commercially available from the Stauffer Chemical Company, e.g.,

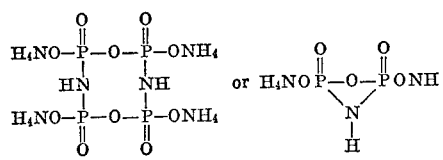

In general, an anticariogenic dentifrice preparation produced in accordance with the subject invention will contain from about 0.05 up to 1.0% by weight of the dentifrice preparation of the fluoride-containing anticariogenic adjuvant. When $SnF_2$ or $SnZrF_6$ are utilized, the amounts are preferably about 0.4% and 0.3%, respectively.

The effectiveness of the zirconium silicate, improved talc, and zirconium silicate-improved talc agents of the present invention as compatible carrier vehicles for fluoride-containing adjuvants may be determined by obtaining the amounts of available fluoride ion in solution. Percentage availability refers to a comparison of an ionic concentration level for a reference solution of the adjuvant without the carrier vehicle (e.g., an aqueous solution of the adjuvant maintained at a reference ionic concentration level, such as 1,000 p.p.m. fluoride). A percentage ratio of the ionic concentration level for the combination solution relative to the reference solution is expressed as a percentage availability (e.g., a combination solution of carrier vehicle and stannous fluoride which analyzes 900 p.p.m. fluoride concentration compared to a reference solution of stannous fluoride at 1,000 p.p.m. fluoride exhibits a 90% availability insofar as ability to provide fluoride ions is concerned). Percentage availability data were determined in the foregoing manner for the following thirteen cleaning and polishing materials with $SnF_2$ as an adjuvant.

TABLE VIII

| Cleaning and polishing agent | Tin (percent) | Fluoride (percent) |
|---|---|---|
| Zirconium silicate "P" | 77.2 | 86.0 |
| Improved talc "P" | 90.8 | 106.7 |
| Improved talc "P"-Zirconium silicate "S" (3:1 weight mixture) | 98.8 | 97.2 |
| Talc (rhomboidic crystal) | 85.0 | 88.4 |
| Calcium carbonate | 2.9 | 3.4 |
| Talc (flat crystal) | 80.9 | 80.3 |
| Insoluble sodium metaphosphate | 71.4 | 87.0 |
| Calcium hydrogen phosphate dihydrate/anhydrous calcium hydrogen phosphate | 3.7 | 21.7 |
| $SnHPO_3$ | 91.1 | 89.1 |
| $SnSiO_3$ | 17.2 | 74.9 |
| $Sn_2SiO_4$ | 56.5 | 63.1 |
| Calcium pyrophosphate | 45.8 | 57.3 |
| Resin (U.S. Patent No. 3,070,510) | 90.4 | 72.0 |

The data of Table VIII verifies that the zirconium silicate, improved talc, and the zirconium silicate-improved talc compositions of the present invention provide excellent carrier vehicles for anticariogenic adjuvants. Of the other tested cleaning and polishing agents only $SnHPO_3$ exhibits high percentage availability for both stannous and fluoride ions. However, as has been previously noted, this material is not as satisfactory in cleaning and polishing performance as the compositions of the present invention.

The presence of zirconium silicate also enhances the compatability of other dentifrice cleaning and polishing agents with anticariogenic ionic adjuvants. Percentage availability data were obtained in the foregoing manner for dentifrices formulated respectively with a 1:3 weight mixture of zirconium silicate and improved calcium pyrophosphate (U.S. Patent No. 3,112,247) and with a 1:3 weight mixture of zirconium silicate and melamine formaldehyde resin (U.S. Patent No. 3,070,510). The dentifrices further included anticariogenic adjuvant systems comprising 0.4% stannous fluoride and 10% Victamide. The percentage availability data are reported in Table IX. The data of Table IX verify that the addition of zirconium silicate to the other agents provides compositions having very high compatabilities with anticariogenic ionic adjuvants.

TABLE IX

| Cleaning and polishing agent | Tin (percent) | Fluoride (percent) |
|---|---|---|
| Zirconium silicate "E"/calcium pyrophosphate [1] (1:3 weight mixture) | 92.8 | 91.1 |
| Zirconium silicate "E"/Resin [2] (1:3 weight mixture) | 94.3 | 87.6 |

[1] U.S. Patent No. 3,112,247.  [2] U.S. Patent No. 3,070,510.

Enamel and dentin abrasion data, enamel cleaning and polishing values, and stannous and fluoride ion compatability values were obtained in the foregoing manner for improved talc, zirconium silicate, and for various improved talc-zirconium silicate mixtures. These data are reported in Table X. The data of Table X indicate that the best over-all performance was obtained with a cleaning and polishing composition comprising three parts by weight improved talc and one part by weight zirconium silicate, although highly satisfactory values were obtained with improved talc alone and with zirconium silicate-improved talc mixtures ranging from about 3:1 to about 1:3 parts talc by weight to parts zirconium silicate.

TABLE X.—DATA OBTAINED USING VARIOUS RATIOS OF IMPROVED TALC AND ZIRCONIUM SILICATE

| Cleaning and polishing agent | Dentifrice abrasion ($P^{32}$) | | Enamel cleaning | Enamel polish | Enamel compatibility (Percent) | |
|---|---|---|---|---|---|---|
| | Enamel | Dentin | | | Stannous ion | Fluoride ion |
| Zirconium silicate "S" | 45.2 | 278 | 3.23 | 4.50 | 91.6 | 95.7 |
| Zirconium silicate "S" plus improved talc "P" (3:1 weight mixture) | 41.3 | 417 | 3.75 | 6.00 | 99.4 | 101.6 |
| Zirconium silicate "S" plus improved talc "P" (1:1 weight mixture) | 28.4 | 431 | 4.25 | 5.70 | 101.6 | 103.6 |
| Zirconium silicate "S" plus improved talc "P" (1:3 weight mixture) | 22.1 | 487 | 4.35 | 6.30 | 101.6 | 101.2 |
| Improved talc "P" | 11.5 | 504 | 4.80 | 4.40 | 90.8 | 106.7 |

Dentifrices prepared according to the preferred practice of the present invention have been proven effective in reducing the incidence of dental caries by clinical studies with humans. In one such study, a total of 250 children 10 to 13 years of age residing in a non-fluoride area were given a thorough clinical dental caries examination with the aid of seven-film bitewing radiographs according to techniques described previously (Muhler, J.A.D.A., 64:216, 1962). The subjects were then divided into five equal groups according to dental age and past dental caries experience and were provided a toothbrush and a supply of the respective dentifrices packaged in plain white, coded tubes. The improved talc-zirconium silicate dentifrice used the preferred 3:1 weight ratio and particle size distributions described previously. Additional supplies of dentifrice and toothbrushes were provided monthly throughout a one-year study period. The subjects were again given a thorough clinical and radiographic dental caries examination at the termination of the study period in order to determine the number of decayed, missing and filled teeth (DMFT) and decayed, missing, and filled surfaces (DMFS), well-known indexes of anticariogenic effectiveness. The results of this study are summarized in the following Table XI.

ploying a zirconium silicate agent of the present invention as an anticalculus cleaning and polishing constituent.

EXAMPLE VI

| Constituent: | Parts by weight (percent) |
|---|---|
| Zirconium silicate "S" | 41.19 |
| Stannous fluoride | 0.40 |
| Victamide | 13.03 |
| Distilled water | 12.48 |
| Glycerin | 10.83 |
| Sorbitol (70% aqueous solution) | 11.12 |
| Sodium lauryl sulfate | 1.98 |
| Sodium carboxymethyl cellulose | 1.03 |
| Metaphosphoric acid | 4.13 |
| Potassium acid phthalate | 2.27 |
| Saccharin, sodium | 0.53 |
| Coloring agents | 0.16 |
| Flavoring agents | 0.82 |
| | 100.00 |

Of course, other anticariogenic adjuvants (e.g., $ZrOGeF_6$, $Zr(GeF_6)_2$, $SnZrF_6$, or $InZrF_7$) could be employed, as could other cleaning and polishing compositions of the present invention such as improved talc or mixtures of zirconium silicate with improved talc, calcium pyrophosphate, melamine formaldehyde resins, calcium hydrogen phosphate dihydrate/anhydrous calcium hydrogen phosphate, and insoluble sodium metaphosphate.

Dentifrice formulations comprising the zirconium silicate and improved talc cleaning and polishing agents disclosed herein provide compositions suitable for frequent home use and are significantly effective in preventing the reformation of dental calculus and more permanent forms of stains. Moreover, when a fluoride-containing anticariogenic adjuvant is incorporated in such a formulation, the anticaries efficacy of the adjuvant is significantly enhanced relative to conventional dentifrices. Utilization of the present invention will substantially increase the success of dentifrice programs involving the use of dentifrice preparations.

While the present invention has been described with reference to certain exemplary embodiments thereof, it should be understood that various changes, modifications, and alterations may be effected in the materials utilized,

TABLE XI

| Group | Dentifrice constituents | Fluoride | Mean DMFT incr. | Mean Percent reduction in DMFT | Mean DMFS incr. | Mean percent reduction in DMFS |
|---|---|---|---|---|---|---|
| 1 | Calcium pyrophosphate [1] | | 4.90 | | 6.64 | |
| 2 | do [1] | $SnF_2$ | 2.47 | 49.5 | 3.75 | 43.6 |
| 3 | Zirconium silicate "S"—Improved talc "P". | $ZrOGeF_6$ | 1.88 | 61.8 | 2.00 | 69.9 |
| 4 | do | $Zr(GeF_6)_2$ | 1.23 | 74.5 | 2.26 | 65.9 |
| 5 | do | $SnF_2$ | 1.35 | 72.5 | 1.89 | 71.5 |

[1] U.S. Patents 2,876,166 and 2,876,168.

The following example illustrates an exemplary anticariogenic fluoride-containing dentifrice formulation emand the proportions of materials, and the manners of formulation, without departing from the spirit and the scope of the present invention, as defined in the appended claims.

What is claimed is:

1. A cleaning and polishing agent adapted for relatively frequent use on dental surfaces comprising uncoated zirconium silicate, $ZrSiO_4$, having a distribution of mean diameter particle sizes in the range of up to about 8 microns and at least one member selected from the group consisting of calcium pyrophosphate, $Ca_2P_2O_7$, anhydrous calcium hydrogen phosphate, $CaHPO_4$, calcium hydrogen phosphate dihydrate, $CaHPO_4 \cdot 2H_2O$, substantially water-impervious, cross-linked, thermosetting, highly polymerized, synthetic resins, insoluble sodium metaphosphate, $(NaPO_3)_x$, calcium carbonate, $CaCO_3$, and mixtures of talc, $Mg_3Si_4O_{10}(OH)_2$, and at least a minor amount of tremolite, $CaMg_3(SiO_3)_4$, said agent comprising at least about 1% zirconium silicate by weight of the agent.

2. A cleaning and polishing agent, as claimed in claim 1, wherein the member is a 1:1 weight mixture of calcium hydrogen phosphate dihydrate and anhydrous calcium hydrogen phosphate.

3. A cleaning and polishing agent, as claimed in claim 1, wherein the member is calcium pyrophosphate, and wherein the zirconium silicate is present at a level of at least about 10% by weight of the agent.

4. A cleaning and polishing agent, as claimed in claim 1, wherein the agent comprises a mixture of calcium pyrophosphate, a substantially water-impervious, cross-linked, thermosetting, highly polymerized, synthetic resin, and zirconium silicate, with the zirconium silicate being present at a level of at least about 10% by weight of the agent.

5. A cleaning and polishing agent, as claimed in claim 1, wherein the member is a mixture of talc and at least a minor amount of tremolite, the agent comprising from about 1:3 to about 3:1 parts by weight of the talc and tremolite mixture to parts by weight of zirconium silicate, the tremolite being present in the mixture at a level of at least about 4% by weight of the mixture.

6. A cleaning and polishing agent, as claimed in claim 1, wherein the zirconium silicate has a distribution of particle sizes in a first level of greater than 0 and equal to or less than 3 microns, in a second level of greater than 3 microns and equal to or less than 5 microns, and in a third level of greater than 5 microns and equal to or less than about 8 microns, the three levels being combined in a percentage ratio range of about 80–95% of the first level, greater than 0 up to about 15% of the second level, and greater than 0 up to about 12% of the third level and wherein the zirconium silicate is present at a level of about 20–70% by weight of the dentifrice preparation.

7. An anticalculus dentifrice preparation comprising as its cleaning and polishing agent uncoated zirconium silicate, $ZrSiO_4$, having a distribution of mean diameter particle sizes in the range of up to about 8 microns, the zirconium silicate being present at a level of about 0.5% up to about 95% by weight of the dentifrice preparation.

8. An anticalculus dentifrice preparation, as claimed in claim 7, wherein the zirconium silicate has a distribution of particle sizes in a first level of greater than 0 and equal to or less than 3 microns, in a second level of greater than 3 microns and equal to or less than 5 microns, and in a third level of greater than 5 microns and equal to or less than about 8 microns, the three levels being combined in a percentage ratio range of about 80–95% of the first level, greater than 0 up to about 15% of the second level, and greater than 0 up to about 12% of the third level, the zirconium silicate being present in the dentifrice preparation at a level of about 20–70% by weight of the dentifrice preparation.

9. An anticalculus dentifrice preparation, as claimed in claim 7, and further comprising at least one member selected from the group consisting of calcium pyrophosphate $Ca_2P_2O_7$, anhydrous calcium hydrogen phosphate, $CaHPO_4$, calcium hydrogen phosphate dihydrate, $CaHPO_4 \cdot 2H_2O$, substantially water-impervious, cross-linked, thermosetting, highly polymerized, synthetic resins, insoluble sodium metaphosphate $(NaPO_3)_x$, calcium carbonate, $CaCO_3$, and mixtures of talc, $Mg_3Si_4O_{10}(OH)_2$, and at least a minor amount of tremolite, $CaMg_3(SiO_3)_4$, said agent comprising at least about 1% zirconium silicate by weight of the agent.

10. An anticalculus dentifrice preparation, as claimed in claim 7, and further comprising about 0.05–1.0% by weight of at least one fluoride-containing anticariogenic adjuvant.

11. An anticalculus and anticariogenic dentifrice preparation, as claimed in claim 10, and further comprising at least one member selected from the group consisting of calcium pyrophosphate, $Ca_2P_2O_7$, anhydrous calcium hydrogen phosphate, $CaHPO_4$, calcium hydrogen phosphate dihydrate, $CaHPO_4 \cdot 2H_2O$, substantially water-impervious, cross-linked, thermosetting, highly polymerized, synthetic resins, insoluble sodium metaphosphate, $(NaPO_3)_x$, calcium carbonate, $CaCO_3$, and mixtures of talc, $Mg_3Si_4O_{10}(OH)_2$, and at least a minor amount of tremolite, $CaMg_3(SiO_3)_4$, the agent comprising at least about 1% zirconium silicate by weight of the agent.

12. A method for cleaning and polishing teeth comprising the application thereto of an anticalculus dentifrice preparation comprising as a cleaning and polishing agent uncoated zirconium silicate, $ZrSiO_4$, having a distribution of mean diameter particle sizes in the range of up to about 8 microns, the zirconium silicate being present at a level of about 0.5% up to about 95% by weight of the dentifrice preparation.

13. A method, as claimed in claim 12, wherein said preparation further comprises at least one member selected from the group consisting of calcium pyrophosphate, $Ca_2P_2O_7$, anhydrous calcium hydrogen phosphate, $CaHPO_4$, calcium hydrogen phosphate dihydrate, $CaHPO_4 \cdot 2H_2O$, substantially water-impervious, cross-linked, thermosetting, highly polymerized, synthetic resins, insoluble sodium metaphosphate, $(NaPO_3)_x$, calcium carbonate, $CaCO_3$, and mixtures of talc $Mg_3Si_4O_{10}(OH)_2$, and at least a minor amount of tremolite, $CaMg_3(SiO_3)_4$, the agent comprising at least about 10% zirconium silicate by weight of the agent.

14. A method, as claimed in claim 12, wherein the dentifrice preparation further comprises about 0.05–1.0% by weight of at least one fluoride-containing anticariogenic adjuvant whereby application of the dentifrice preparation to teeth reduces the cariogenic potential thereof.

15. A cleaning and polishing agent adapted for relatively frequent use on dental surfaces comprising a mixture of talc, $Mg_3Si_4O_{10}(OH)_2$, and at least a minor amount of tremolite, $CaMg_3(SiO_3)_4$, the said mixture having a distribution of mean diameter particle sizes in the range of up to about 50 microns.

16. An anticalculus dentifrice preparation comprising as its cleaning and polishing agent about 0.5–95% by weight of the preparation of a mixture of talc, $Mg_3Si_4O_{10}(OH)_2$, and at least a minor amount of tremolite, $CaMg_3(SiO_3)_4$, the said mixture having distribution of mean diameter particle sizes in the range of up to about 50 microns.

17. A dentifrice preparation, as claimed in claim 16, and further comprising about 0.05–1.0% by weight of at least one fluoride-containing anticariogenic adjuvant whereby the preparation is rendered anticariogenic.

18. A method for cleaning and polishing teeth comprising the application thereto of an anticalculus dentifrice preparation comprising as a cleaning and polishing agent about 0.5–95% by weight of the preparation of a mixture of talc, $Mg_3Si_4O_{10}(OH)_2$, and at least a minor amount of tremolite, $CaMg_3(SiO_3)_4$, the said mixture having a distribution of mean diameter particle sizes in the range of up to about 50 microns.

19. A method, as claimed in claim 18, wherein the dentifrice preparation further comprises about 0.05–1.0% by weight of at least one anticariogenic adjuvant whereby application of the dentifrice preparation to the teeth reduces the cariogenic potential thereof.

References Cited

UNITED STATES PATENTS

| | | | |
|---|---|---|---|
| 2,427,799 | 9/1947 | Maloney | 51—308 |
| 3,105,013 | 9/1963 | Saul et al. | 167—93 |
| 3,151,027 | 9/1964 | Cooley et al. | 167—93 |
| 3,330,732 | 7/1967 | Muhler | 167—93 |

OTHER REFERENCES

Dudding et al., The Journal of the Indiana State Dental Association, vol. 44, pages 54–57, February 1965.

RICHARD L. HUFF, Primary Examiner.

U.S. Cl. X.R.

424—49, 57